United States Patent
Shahin

(10) Patent No.: US 12,516,707 B2
(45) Date of Patent: Jan. 6, 2026

(54) MULTI-PART BRAKE CALIPER FOR VEHICLE DISC BRAKE

(71) Applicant: HL MANDO CORPORATION, Pyeongtaek (KR)

(72) Inventor: Hatem Shahin, Pfaffenhofen (DE)

(73) Assignee: HL MANDO CORPORATION, Pyeongtaek (KR)

( * ) Notice: Subject to any disclaimer, the term of this patent is extended or adjusted under 35 U.S.C. 154(b) by 359 days.

(21) Appl. No.: 18/181,837

(22) Filed: Mar. 10, 2023

(65) Prior Publication Data

US 2023/0296150 A1     Sep. 21, 2023

(30) Foreign Application Priority Data

Mar. 15, 2022   (DE) ...................... 10 2022 202 579.2

(51) Int. Cl.
*F16D 65/00*      (2006.01)
*F16D 55/00*      (2006.01)

(52) U.S. Cl.
CPC .... *F16D 65/0075* (2013.01); *F16D 2055/002* (2013.01); *F16D 2250/0084* (2013.01)

(58) Field of Classification Search
CPC ........... F16D 65/0075; F16D 2055/002; F16D 2250/0084
USPC .............. 188/72.4, 72.5, 73.39, 73.46, 73.47
See application file for complete search history.

(56) References Cited

U.S. PATENT DOCUMENTS

| | | | |
|---|---|---|---|
| 5,284,227 A | 2/1994 | Pelfrey | |
| 5,515,948 A * | 5/1996 | Gilliland | ............... F16D 55/228 188/72.5 |
| 8,028,810 B2 * | 10/2011 | Bach | ..................... F16D 65/092 188/73.47 |
| 9,737,929 B2 * | 8/2017 | Morais | ...................... B22C 9/10 |
| 10,502,275 B2 * | 12/2019 | Piccoli | .................. F16D 55/228 |
| 2007/0089943 A1 * | 4/2007 | Gilliland | ............... F16D 55/228 188/73.46 |
| 2014/0299424 A1 * | 10/2014 | Arakane | ............... F16D 55/228 188/73.32 |
| 2023/0304549 A1 * | 9/2023 | Shahin | ................ F16D 65/0075 |
| 2023/0417297 A1 * | 12/2023 | Shahin | ................ F16D 65/0006 |

FOREIGN PATENT DOCUMENTS

| | | |
|---|---|---|
| DE | 3147200 A1 | 10/1982 |
| DE | 102007006472 A1 | 11/2007 |
| DE | 102010052435 A1 | 6/2011 |
| DE | 102013200735 A1 | 8/2013 |

(Continued)

OTHER PUBLICATIONS

DE_1OA Jul. 25, 2022.
DE_2OA Oct. 14, 2022.

*Primary Examiner* — Christopher P Schwartz
(74) *Attorney, Agent, or Firm* — Harvest IP Law, LLP

(57) ABSTRACT

The invention concerns a multi-part brake caliper for a vehicle disc brake, the brake caliper comprising: a first part comprising a portion that is arrangeable at a first side face of a brake disc of the vehicle disc brake; a second part that is formed separately form the first part and comprises a portion that is arrangeable at a second side face of the brake disc; a middle part connecting the first part and the second part; wherein the middle part is mechanically fixed to at least one of the first and second part.

12 Claims, 15 Drawing Sheets

(56) References Cited

FOREIGN PATENT DOCUMENTS

| DE | 102012112823 A1 | 6/2014 |
| KR | 101607625 B1 | 3/2016 |
| KR | 20210087837 A | 7/2021 |

* cited by examiner

MULTI-PART BRAKE CALIPER FOR VEHICLE DISC BRAKE

CROSS-REFERENCE TO RELATED APPLICATION

This application is based on and claims priority under 35 U.S.C. § 119 to German Patent Application No. 102022202579.2, filed on Mar. 15, 2022 in the German Patent and Trade Mark Office, the disclosures of which are incorporated herein by reference

TECHNICAL FIELD

The invention relates to a multi-part brake caliper for a vehicle disc brake and to a method for producing the same. The vehicle to be braked by the vehicle disc brake may in particular be a road vehicle, such as a car, a truck or a bus.

BACKGROUND

Brake calipers are typically used to support and carry at least one brake pad that is movable relative to a braked member. The braked member may in particular be a brake disc of a vehicle disc brake. The brake caliper may also be referred to as a caliper frame. The brake caliper may receive a brake piston and/or may house at least part of a (e.g. electric or hydraulic) brake actuating mechanism.

Typically, the brake caliper receives at least part of the brake disc, such as a radially outer section and/or faces opposite sides of the brake disc. This way, a pair of brake pads that are supported by the brake caliper can be arranged on opposite sides of the brake disc. In a generally known manner, the brake pads can thus clamp the brake disc in between them.

Each brake pad is arranged at one of a first and second inner face of the brake caliper and specifically at a so called finger side or piston side thereof. Said inner faces and said sides lie on opposite sides of the brake disc and/or are spaced apart from one another along a rotational axis of the braked member.

A prior art example of a brake caliper can be found in KR 2009 007718 A.

During brake activation, large forces act on the brake caliper. The brake caliper may thus elastically deform or, put differently, elastically deflect. In existing brake calipers this can be accompanied with a number of disadvantages. For example, an uneven wear of the brake pads and specifically of their brake linings may occur. This may result in further problems, such as the generation of drag torque or noise. Furthermore, a hydraulic volume absorbed by the brake caliper and more specifically by a hydraulic chamber comprised by the brake caliper may increase as a result of the deformation. This additional brake fluid volume absorption is generally undesired for brake performance and/or safety reasons.

Further disadvantages of existing brake calipers result from their production. Typically, brake calipers are designed as metallic one-piece casted or shaped parts. This puts limitations on their design which restricts the possibility to improve their elastic deformation characteristics.

SUMMARY

It is an object of this disclosure to provide a brake caliper and a method for producing same that limits at least some of the above disadvantages.

This object is solved by the subject matter according to the independent claims. Advantageous embodiments are defined in this description and in the dependent claims.

Accordingly, a multi-part brake caliper for a vehicle disc brake is suggested.

The brake caliper comprises:
a first part comprising a portion that is arrangeable at a first side face of a brake disc of the vehicle disc brake;
a second part that is formed separately from the first part and comprises a portion that is arrangeable at a second side face of the disc brake;
a middle part connecting the first part and the second part; wherein the middle part is mechanically fixed to at least one of the first part and second part.

The first part and that second part may be configured as a separate members or, put differently, as separate pieces. They may be produced separately and with different production methods. They may be assembled and in particular mechanically connected by the middle part during an assembly process, thereby forming the brake caliper.

The middle part may likewise be configured as a member or as a piece that is separate from the first part and/or the second part. It may be produced by a production method that is different from a production method used for producing at least one of the first part and second part.

The first part, the middle part and the second part may define a sequence of parts along the rotational axis. The middle part may be arranged in between the first part and the second part, in particular when viewed along the rotational axis. There may be no axially overlaps between the first part and the second part. Rather, the first part and the second part may be spaced apart from one another by the middle part and/or by an axial distance of several centimetres, e.g. at least 10 cm.

The first part may define an outermost axial end portion of the brake caliper when viewed in a first direction of the rotation axis. The second part may define a different outermost axial end portion of the brake caliper when viewed in an opposite second direction of the rotation axis. In other words, the first part and the second part may define opposite outermost axial end portions of the brake caliper. The first part, the second part and the middle part may each be one-piece members, in particular integral members having a homogeneous material composition. Alternatively, any of the first part, the second part in the middle part may be multi-piece members, wherein said pieces are in particular fixed or joined to one another to provide a coherently movable composite part. Of course, the brake caliper may comprise any combination of any of the first part, the second part a middle part being provided as a one piece member or as a multi-piece member.

An optional axial overlap between the first part and the middle part and/or between the second part and the middle part may be limited to less then 30% and preferably less than 10% of an axial dimension of at least one of the respective parts (i.e. of at least one of the first part and the middle part and/or of at least one of the second part and the middle part). This may in particular concern an optional axial overlap in a region of contact and/or a region of mechanical fixation between these parts. The optional axial overlap in said regions may comprise a form fit between the parts, e.g. to contribute to their mechanical connection.

Alternatively, there may be no axial overlap between the first part and in the middle part and/or between the second part and the middle part, in particular not in a region of contact and/or mechanical fixation between them.

The mechanical fixation may be releasable. It may be provided by means of at least one mechanical fixation element, such as a screw or bolt. Through holes or recesses may be provided in the mechanically connected parts for receiving the optional mechanical fixation element. The mechanical fixation may be the only fixation provided between the respective parts. For example, these parts may not be additionally glued or welded together. This may improve deformation characteristics of the brake calliper in a manner disclosed below.

By designing the brake caliper as a respective multi-part member and compared to providing known one-piece configurations, it is possible to increase the degrees of freedom for designing each of the first part, the second part and the middle part. For example, each of the first part, the second part of the middle part may be produced independently of any of the respective other parts. This provides freedom e.g. with respect to a selection of production methods as well as a selection of materials, dimensions or shapes. In consequence, the single parts may be optimized with respect to the overall deformation characteristics of the brake caliper and/or with respect to their individual production costs.

Other advantages may be achieved by the mechanical connection between the middle part and at least one of the first part and the second part. For example, said mechanical connection may help to dissipate at least part of the deformation energy occurring under high brake loads. Additionally or alternatively, the mechanical connection may provide an elastic joint function. This may help to alter the deformation characteristics in a desired manner.

Generally, a preferred deformation characteristic may be marked by the inner faces of the first part and the second part which faces the brake disc essentially maintaining their relative orientation to one another even under high brake loads. For example, they may maintain in essentially parallel orientation to one another. This e.g. helps to limits irregular brake pad wear and heat generation of the brake pads connected to said parts as well as any of the other drawbacks mentioned in the above introductory portion.

In more detail, it has been determined that as a result of the elastic deformation of existing brake calipers a significant deformation or deflection of the inner faces of the brake caliper facing the brake disc and typically carrying the brake pads may occur. As a result, an axial distance between said faces may increase and may locally vary. For example, the faces may slightly tilt with respect to one another and/or with respect to the rotational axis of the brake disc. They may thus assume a non-parallel orientation and/or may generally become slanted, in particular at different angles compared to one another. This may result in an uneven widening of a gap between the faces and/or in uneven axial local deflection and displacement across and within each face. This may e.g. promote uneven wear of the brake pads. This may at least partially be prevented by solution disclosed herein.

According to a preferred embodiment, the first part and the second part are spaced apart from one another by the middle part. This may particular concern the first and the second being axially spaced apart from one another. Differently put, the middle part may be axially arranged between said first and second part, so that these may remain at an axial distance to one another.

Additionally or alternatively, the middle part may be the only part connecting the first part and second part.

In one example, the middle part is arrangeable so as to extend along the rotational axis of the brake disc. In particular, it may span an axial gap between the first part and the second part and/or span across (and above) the brake disc from one side to another. In this context, it may lie opposite to an outer circumferential face of the brake disc. The extension of the middle part may in particular include (or, put differently, overlap with) an axial position of the first side face of the brake disc and/or an axial position of the second side face of the brake disc.

The mechanical fixation of the middle part to the first part and/or the second part may be positioned at or near an axial position of an inner face of the respective first part and second part, said face facing the brake disc.

According to a further embodiment, the middle part is integrally formed with the respective other of the first and second part to which it is not mechanically fixed. This may limit the required assembly steps and still allow at least one of the first part and second part to be independently produced and/or optimized.

In one example, at least one of the first and second part comprises a cavity for receiving a brake piston. The respective other of the first and second part may also comprise such cavity or may be free of such a cavity. Any of the first and second part and in particular both may each support and/or carry at least one brake pad. For example, they may carry and/or guide a brake pad during an axial displacement thereof when braking.

According to a further development, the mechanical fixation (or, put differently, the mechanical connection providing said fixation) of the middle part to the at least one of the first and second part includes at least one elastic member. For example, said at least one elastic member may be included in the mechanical connection providing said fixation. This way, at least part of the deformation energy at high brake loads may be dissipated by said elastic member, thus e.g. limiting tilting of the side faces of the first part and second part relative to each other.

The elastic member may be a washer or any other part that is configured to act as an elastic spacer. The elastic member may be arranged (in particular axially) in between the middle part and the respective one of the first part and second part to which the middle part is fixed. It may contact at least one of these parts.

The mechanical fixation (put differently, mechanical connection) may further comprise at least one mechanical fixing element. This mechanical fixing element may rest against or be supported by said elastic member, in particular when configured as a washer. This provides a simple and compact fixation which at the same time helps to define elastic characteristics of the brake caliper in a desired manner. In particular when providing an elastic washer, a mechanical fixation may be achieved that acts as a joint with defined elastic deformation characteristics.

According to a further example, the middle part may comprise at least one recess or at least one through-hole, in particular in a side facing away from the brake disc. Said side may be equivalent to a radially outer side of the middle part. The recess may define a radial indentation. The through-hole may extend radially, e.g. from a radially outer side facing away from the brake disc to a radially inner side. The recess and/or through-hole may be elongated, e.g. axially or circumferentially.

By means of the recess or through-hole, weight savings can be achieved. In this context, the increased degree of freedom, e.g. it terms of shapes and dimensions, that is achieved by forming the middle part separately from at least one of the first part and second part is particularly beneficial.

More precisely, this increases respective degrees of freedom also with regard to the design of the respective recesses and through-holes.

In one example, at least one of the first part, the second part and the middle part is made from or comprises a material that is different from a material of a respective other of the first part, the second part and the middle part. Nonetheless, all of these parts may be made from or comprise a metallic material. Accordingly, at least two different materials may be present and/or may be distributed between said parts. This underlines the increased flexibility in designing the brake caliper compared to existing one-piece configurations.

Generally, at least one the first part, the second and the middle part may be a non-casted part. For example, it may be shaped part or a part produced by layering and/or welding several material sheets above one another.

The invention also concerns a method of producing (in particular assembling) a brake caliper for a vehicle disc brake, the caliper comprising:
- a first part comprising a portion that is arrangeable at a first side face of a brake disc of the vehicle disc brake;
- a second part comprising a portion that is arrangeable at a second side face of the brake disc;
- a middle part;

and the method comprising:
mechanically fixing the middle part to at least one of the first part and second part, thereby connecting the first part and the second part by the middle part.

Note that in case the middle part is integrally formed with one of the first part and second part, fixing it to the respective other of the first part and second part may suffice to provide a mechanical connection between the first part and the second part. If provided separately from both of the first part and the second part, the middle part may be mechanically fixed to both these parts to provide the mechanical connection therebetween.

According to a further embodiment, the method may further comprise:
producing at least one of the first part, the second part and the middle part by a production method that is different from a production method of the respective other parts.

The production methods may be generically or categorically different. For example, they may relate to different main groups as classified in the German Industrial Norm (DIN) 8580 (i.e. casting, shaping, separating, joining, coating). Generally, at least one of the parts may be produced by a production method that is different from casting.

BRIEF DESCRIPTION OF DRAWINGS

Embodiments of the invention are discussed in the following with respect to the attached schematic figures. Similar features may be marked with same reference signs throughout the figures.

DETAILED DESCRIPTION

Figure 1:
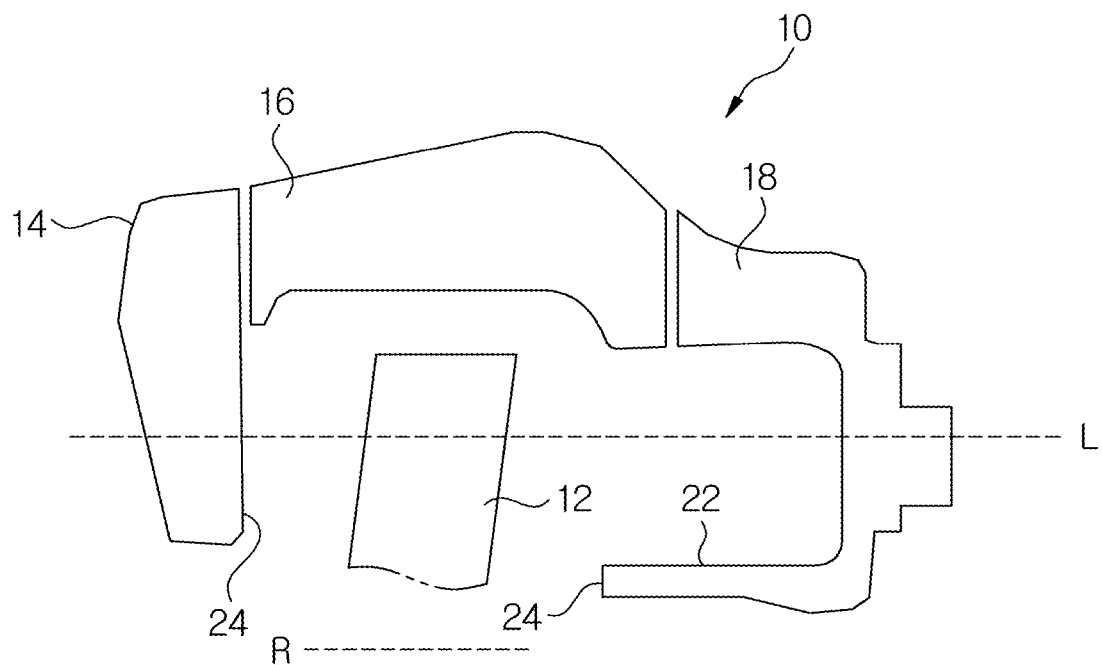
FIG. 1 is a schematic sectional view of a multi-part brake caliper according to an embodiment of the invention in a non-mechanically fixed state.

FIG. 1 is a schematic sectional view of a multi-part brake caliper 10 according to an embodiment of the invention. The multi-part brake caliper 10 comprises three separate parts that are depicted in a non-assembled state, i.e. that are not fixed and not connected to one another. A longitudinal axis L of the brake calliper 10 extends in parallel to a schematically indicated rotation axis R of a brake disc 12. The sectional plane of FIG. 1 comprises the longitudinal axis L (and rotation axis R).

Only an upper rim portion of said brake disc 12 is depicted in FIG. 1. Even though no illustrated in the subsequent figures, the brake callipers 10 of the further embodiments are similarly oriented with respect to a brake disc 12.

Figure 2:
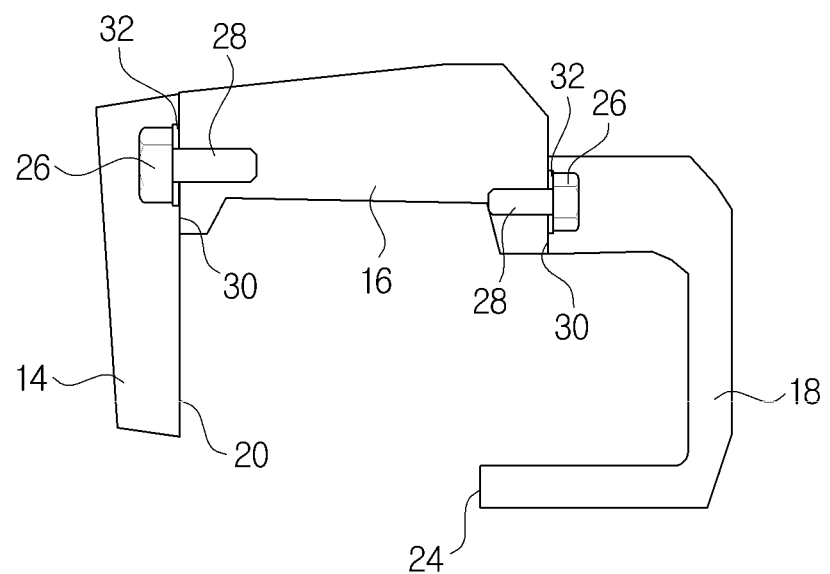
FIG. 2 shows the brake caliper of FIG. 1 in a mechanically fixed state.

The three parts of the brake calliper 10 are (from left to right) a first part 14, a middle part 16 and a second part 18. As shown in FIG. 2, this arrangement defines an axial succession that is maintained in the assembled and fixed state of the brake calliper 10.

Accordingly, the first part 14 and second part 18 form axial end potions of the brake calliper 10. The middle part 16 is arranged axially in between the first part 14 and second part 18 or, in other words, in sandwiched in between said parts 14, 18.

The first part 14 is positioned at and at least partially defines a so-called finger side of the brake caliper 10. Said side may face away (or be further apart) from a vehicle chassis and/or from axle components to which a vehicle disc brake comprising the brake calliper 10 is mounted.

The first part 14 comprises a first (axially inner) side face 20 of the brake calliper facing a side face of the brake disc 12. At said first side face 20, a non-illustrated braked pad is arrangeable in generally known manner. The brake pad is a plate-shaped member extending orthogonally to the image plane and along the first side face 20.

The middle part 16 axially spans across and/or bridges the brake disc 12. More precisely, its axial dimension extends at least form an axial position of the side face 20 of the first part 14 to an inner side face 24 of the second part 18.

The second part 18 is positioned at and at least partially defines a so-called piston side of the brake caliper 10. Said side may face towards (or be closer to) a vehicle chassis and/or towards axle components to which a vehicle disc brake comprising the brake calliper 10 is mounted. It comprises a cylindric cavity 22 having an open base surface for receiving a non-illustrated brake piston. In a generally known manner, this cavity 22 defines a hydraulic chamber together with the piston. By varying a hydraulic volume and thus pressure within said chamber, a braking action may be activated and deactivated.

As further evident from FIGS. 3 and 5 below, the second part 18 also comprises an second inner side face 24 facing another side face of the brake disc 12. Generally, the first and second faces 20, 24 of the first part 14 and second part 20 face one another. They confine a slot-like space for receiving the brake disc 12.

The disclosure is not limited to the depicted specifics of the first part 14 and second part 18. For example, the cavity 22 could alternatively be provided in the first part 14 or both of the first part 14 and second part 18 could each comprise at least one respective cavity 22. Also, there may generally be no such cavity 22 or at least no cavity 22 defining a hydraulic chamber. Instead, the vehicle disc brake comprising the brake calliper 10 may e.g. be actuated electrically.

In FIG. 1, the first part 14, the middle part 16 and the second part 18 are configured as separate parts. It may be provided that the middle part 16 is integrally formed with one of the first part 14 and second part 18.

FIG. 2 shows an assembled state of the brake calliper 10 of FIG. 1. The assembled state includes that the first part 14 is mechanically fixed and thus mechanically connected to the middle part 16. Also, it includes that the second part 18 is mechanically fixed and thus mechanically connected to the middle part 16.

The mechanical fixation is achieved by screw bolts 26 acting as mechanical fixing elements. The screw bolts 26 are received in longitudinal holes 28 extending through each of two respectively connected parts 14, 16, 18, at least one of a respective pair of holes comprising threads.

The bolts 26 and thus the mechanical connection is positioned so as to overlap with an axial position of the inner side face 20 of the first part 14 and inner side face 24 of the second part 18. They are positioned in regions in which the shape of the calliper 10 changes from extending along a side face of the brake disc 12 to spanning across the brake disc 12. Put differently, the bolts 26 (or generally the mechanical fixation) are/is provided in angled portions 30 of the calliper 10. These corner or angled portions 30 are each provided at and/or comprise an axial outer edge of the middle part 16.

It has been determined that mechanical stresses when actuating the brake are particularly large in said angled corner portions 30. Thus, providing mechanical fixation at or within said corner portions 30 may generally increase stability and rigidity of the brake calliper 10. Positioning the mechanical fixation accordingly is achieved by arranging contact surfaces of the respectively joined parts 14, 16, 18 and their through holes at least partially in or overlapping with said corner portion 30.

In the shown example, the mechanical fixation also comprises an elastic member 32 in form of a washer. A head of each bolt 26 rests against said elastic member 32. Accordingly, each bolt 26 is elastically supported, so that these provide an joint-like elastic connection. This way, at least part of the mechanical stresses generated at during braking is dissipated by said elastic member 32. This limits a risk that a relative orientation between the faces of the first and second part 14, 18 significantly changes, i.e. that an axial distance A between said faces significantly and in particular irregularly changes across said faces 20, 24 (see FIG. 3).

The position of the bolts 26 along an axis extending perpendicular to the image plane is only by way of example. The bolts 26 may be provided outside of the sectional plane of FIG. 2, e.g. farther away or closer to the viewer along the axis extending perpendicular to the image plane. Accessibility to the holes 28 receiving the bolts 26 can be achieved by providing suitable cut-outs, grooves or the like. Alternatively, projections may be formed at outer sides of any of the parts 14, 16, 18 as partially the case in FIG. 5 (see second part 18).

Figure 3:
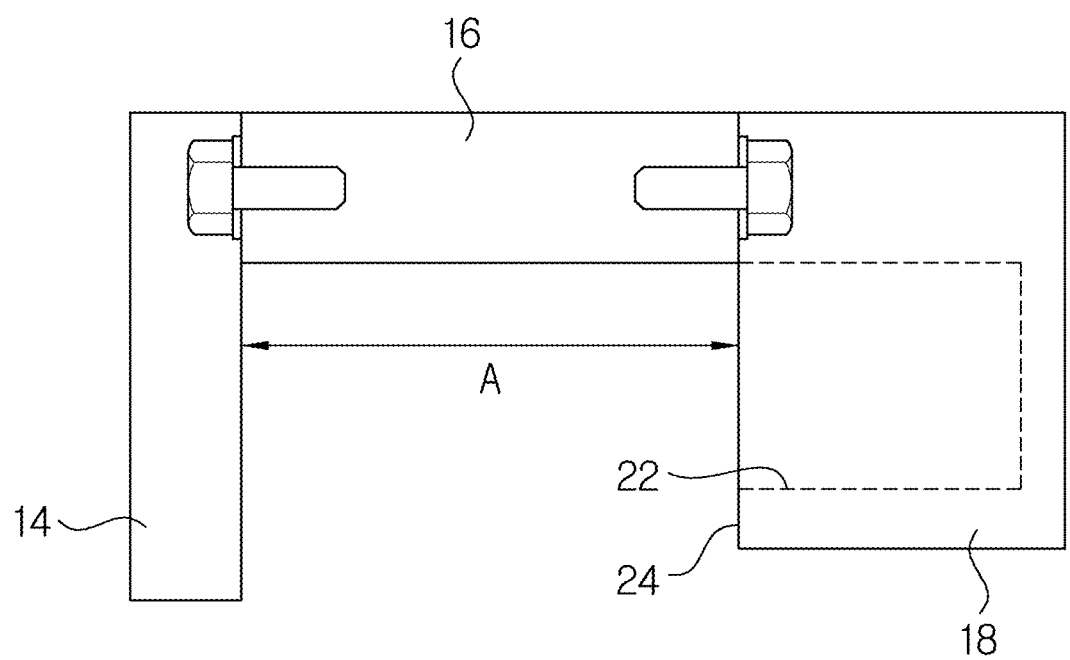
FIG. 3 shows a side view of a multi-part brake caliper according to a further embodiment of the invention.

FIG. 3 is a side view of calliper 10 according to a further embodiment. Again, the first part 14, second part 18 and middle part 16 are configured as separate parts that are mechanically fixed to one another. A cavity 22 indicated by dotted lines is provided in the second part 18. The positions of the bolts 26 perpendicular to the image plane is again highly schematic and suitable recess (not illustrated) are provided especially in the first part 14 and second part 18 so that the bolts 26 are insertable to assume their depicted positions.

Figure 4:
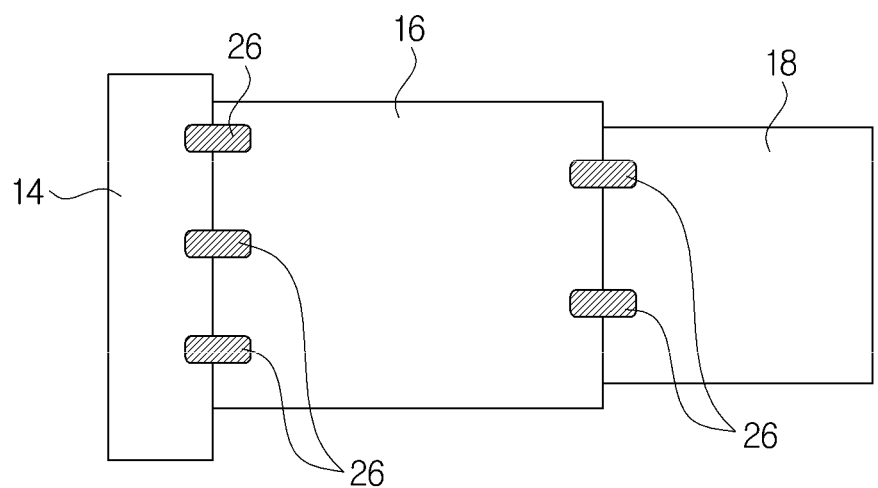
FIG. 4 is a top view of the brake caliper of FIG. 3.

FIG. 4 is a top view of FIG. 3. It shows that for each mechanically fixed pair of parts 14, 16, 18, a plurality of bolts 26 (or other mechanical fixing elements) may be provided. These are distributed along the contact faces between the respective parts 14, 16, 18.

Figure 5:
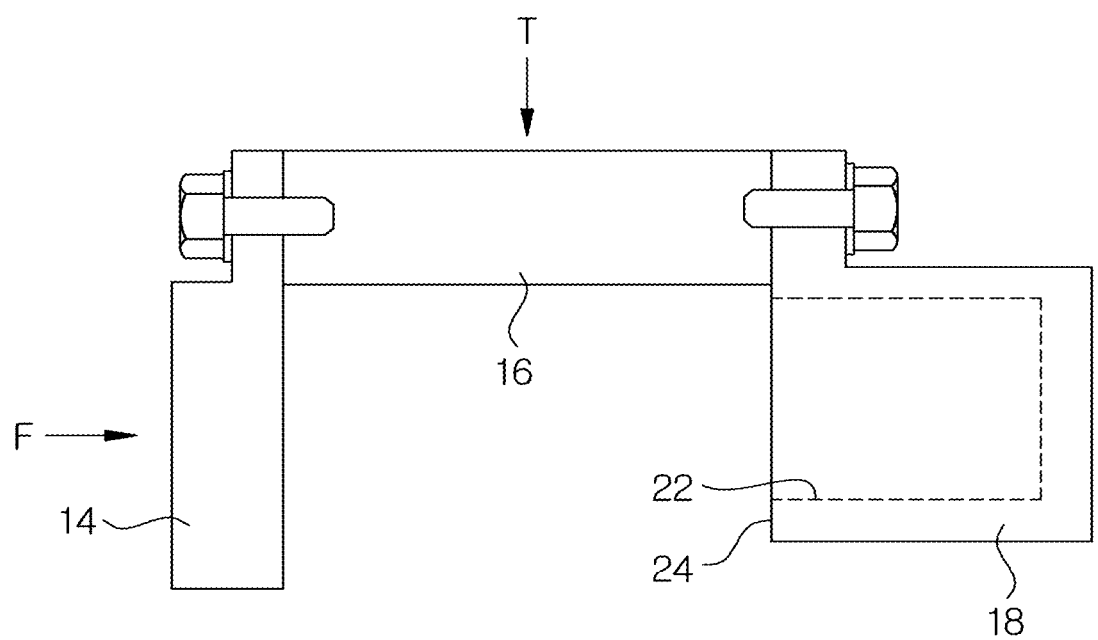
FIG. 5 shows a side view of a multi-part brake caliper according to a further embodiment of the invention.

FIG. 5 is a view similar to FIG. 3 and showing a further embodiment of a brake caliper 10. It shows a further possible variation of the shape of the brake caliper 10. Specifically, the second part 18 is provided with an upper step or projection comprising a hole for receiving one of the bolts 26, This improves accessibility and simplifies assembly, A major advantage of providing the plurality of separate parts 14, 16, 18 is that these can be produced independently from one another and even by generically different production methods. This allows for an individual optimisation of each part, e.g. in terms of costs and/or rigidity without being severely restricted by boundary conditions concerning the respective other parts 14, 16, 18. For example, the first part 14 may be a non-casted part (e.g. produced by metallic shaping), whereas the second part 18 may be a metal-cast part.

The middle part 16 may comprise a layer of sheet metals or may be welded from different parts. On the other hand, even if producing each part 14, 16, 18 with the generically same production method (e.g. casting) they can still be individually optimized which can bring about improvements compared to existing one-piece designs.

FIGS. 6-11 each show a front view of possible designs of a first part 14 that can be used in a brake calliper 10 according to the above or any other embodiment of this invention. The viewing angle corresponds to the arrow F in FIG. 5, i.e. with the respective front side of the first part 14 turned by 90° towards the viewer in FIGS. 6-11.

Figure 11:
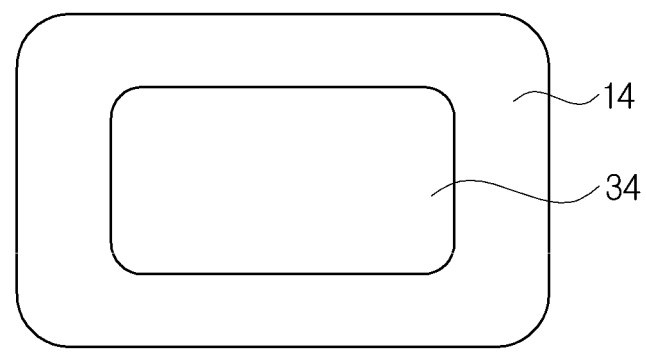

The range of different shapes and dimensions is made possible by being able to produce the first part 14 independently of the other parts 16, 18, thus not being restricted to their needs in terms of production. Especially when not casting the first part 14, its shape does not need be adjusted to allow for sanding operations after casting. This increases the flexibility of design. In consequence, one is not limited to so-called finger shapes that are typical in the prior art. FIG. 11 shows a frame like design of the first part 14 with a central recess or through-hole 34 surrounded by an enclosing rim portion. This helps to save weight.

Figure 6:
FIGS. 6-11 show front views of a first part of multi-part brake caliper according to embodiments of the invention.
Figure 7:
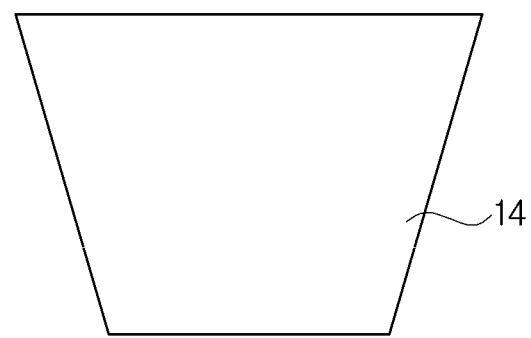
Figure 8:
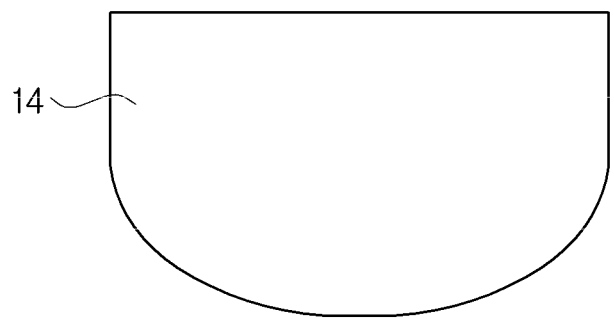
Figure 9:
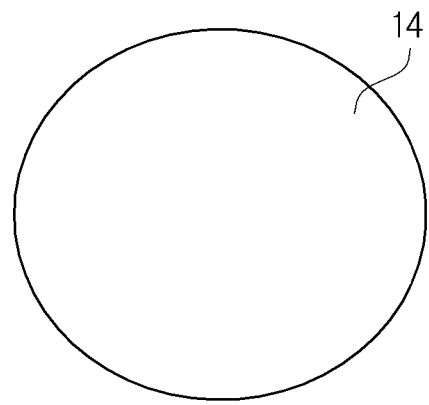
Figure 10:
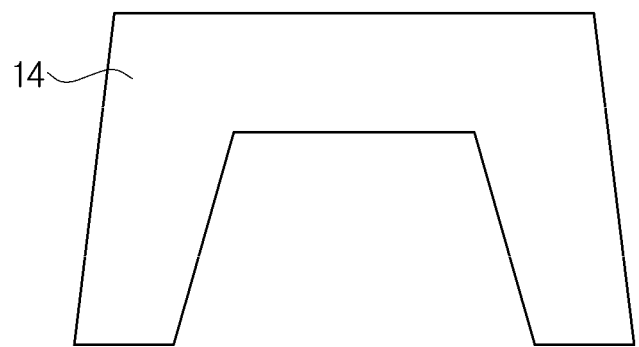
Figure 12:
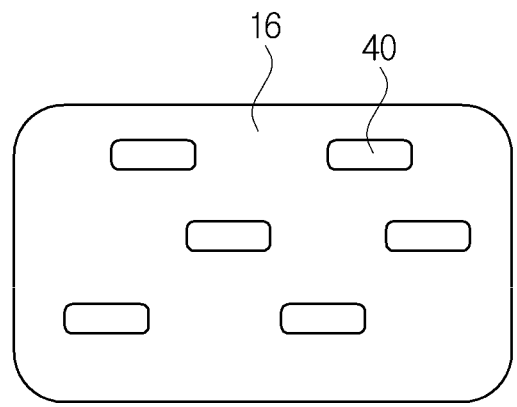
FIGS. 12-14 show top views of a middle part of multi-part brake caliper according to embodiments of the invention.
Figure 13:
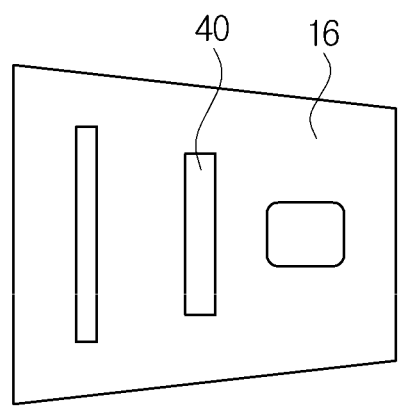
Figure 14:
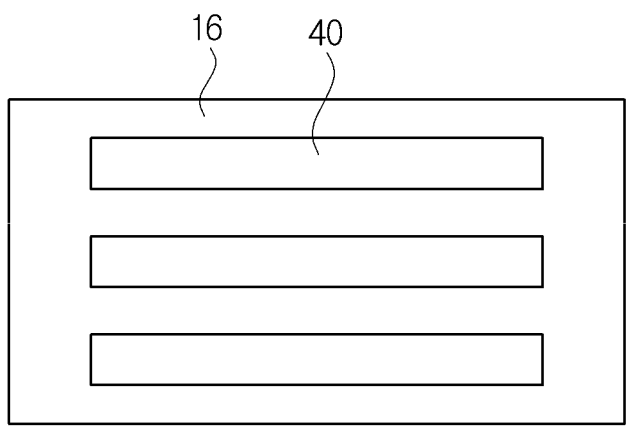

FIG. 12-14 show top views of possible designs of a top side of the middle part 16 according to the arrow T in FIG. 5 (i.e. with the respective top side of the first part 14 turned by 90° towards the viewer in FIGS. 12-14). The top sides each comprise a number of recesses or through-holes 40 (not each single one of which being marked by an own reference sign). In FIG. 6, smaller recesses or through-holes are distributed in a grid-like pattern. In FIGS. 7 and 8, most or all of the recesses or through-holes are elongated and extend axially (FIG. 8) or perpendicular to the axial direction and along the brake disc's circumference (FIG. 7).

Further, the middle parts 16 in FIGS. 6-8 show a range of different shapes and footprints. Again, these degrees of freedom in design are enabled by producing the middle part 16 separately form at least one of the first and second part 14, 18.

Figure 15:
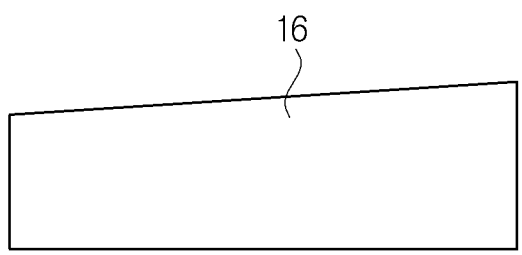
FIGS. 15-17 show side views of a middle part of multi-part brake caliper according to embodiments of the invention.
Figure 16:
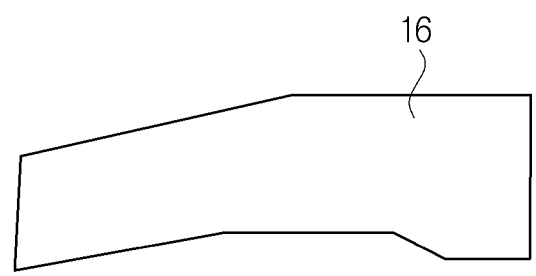
Figure 17:
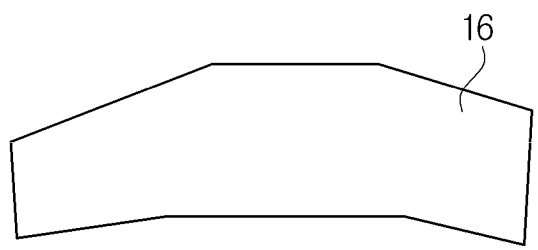
Figure 18:
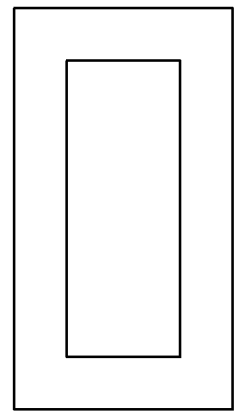
FIGS. 18-25 show views of an elastic member for a multi-part brake caliper according to embodiments of the invention.
Figure 19:
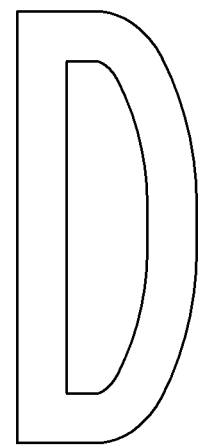
Figure 20:
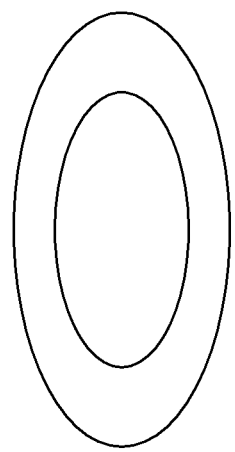
Figure 21:
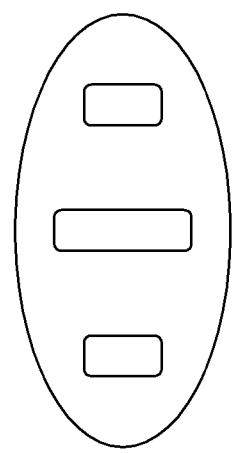
Figure 22:
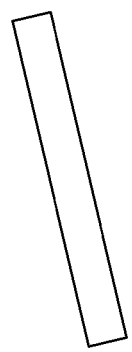
Figure 23:
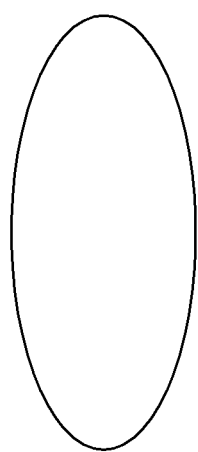
Figure 24:
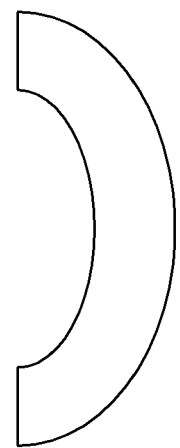
Figure 25:

FIGS. 15-17 show side views of possible designs of a side of the middle part 16 facing the viewer in FIG. 5. Said side can be trapezoidal (FIG. 15), angled (FIG. 16) or curved (FIG. 17).

The designs of FIGS. 15-17 can be freely combined with any of the designs in FIG. 12-14.

FIGS. 18-25 show possible designs of an elastic member 32. These members 32 can be arranged between the parts 14, 16, 18 to be fixed to one another and/or between a fixing element 26 and a respective part 14, 16, 18. The side facing the viewer can face a bolt head or part 14, 16, 18 to be fixed. Alternatively, the elastic members 32 can be arranged between the parts 14, 16, 18 and/or between the bolt 26 and the part 14, 16, 18 so that one of their (e.g. left and right) sides in FIGS. 18-25 faces the bolt 26 or one part 14, 16, 18 and the other side faces the respective other part 14, 16, 18.

What is claimed is:

1. A multi-part brake caliper for a vehicle disc brake, the brake caliper comprising:
    a first part comprising a portion that is arrangeable at a first side face of a brake disc of the vehicle disc brake;
    a second part that is formed separately from the first part and comprises a portion that is arrangeable at a second side face of the brake disc;
    a middle part connecting the first part and the second part;
    wherein the middle part is mechanically fixed to at least one of the first and second parts,
    wherein a mechanical fixation between the middle part and one of the first and second parts includes at least one elastic member, and
    the at least one elastic member is arranged between the middle part and said one of the first and second parts.

2. The brake caliper of claim 1,
    wherein the first part and the second part are spaced apart from one another by the middle part, or wherein the middle part is the only part connecting the first part and the second part.

3. The brake caliper of claim 1,
    wherein the middle part is arrangeable so as to extend along the rotational axis of the brake disc and at least from an axial position of the first side face of the brake disc to an axial position of the second side face of the brake disc.

4. The brake caliper according to claim 1,
    wherein the mechanical fixation of the middle part to said one of the first and second parts is positioned at or near an axial position of an inner face of said one of the first and second parts, said inner face facing a respective brake disc's side face.

5. The brake caliper according to claim 1,
    wherein the middle part is integrally formed with the respective other of the first and second parts to which it is not mechanically fixed.

6. The brake caliper according to claim 1,
    wherein one of the first and second parts comprises a cavity for receiving a brake piston, wherein the respective other of the first and second parts is free of the cavity.

7. The brake caliper according to claim 1,
    wherein the at least one elastic member is a washer and the mechanical fixation further comprises at least one mechanical fixing element resting against said washer.

8. The brake caliper according to claim 1,
    wherein the middle part comprises at least one recess or at least one through-hole in a side facing away from the brake disc.

9. The brake caliper according to claim 1,
    wherein at least one of the first part, the second part and the middle part is made from or comprises a material that is different from a material of a respective other of the first part, the second part and the middle part.

10. The brake caliper according to claim 1,
    wherein at least one of the first part, the second part and the middle part is a non-casted part.

11. A method of producing a brake caliper for a vehicle disc brake, the brake caliper comprising:
    a first part comprising a portion that is arrangeable at a first side face of a brake disc of the vehicle disc brake;
    a second part comprising a portion that is arrangeable at a second side face of the brake disc;
    a middle part;
    and the method comprising:
    mechanically fixing the middle part to at least one of the first part and second part, thereby connecting the first part and the second part by the middle part,
    wherein a mechanical fixation between the middle part and one of the first and second parts includes at least one elastic member, and
    the at least one elastic member is arranged between the middle part and said one of the first and second parts.

12. The method of claim 11,
    further comprising:
    producing at least one of the first part, the second part and the middle part by a production method that is different from a production method of the respective other parts.

* * * * *